United States Patent

Coran et al.

[15] 3,681,356
[45] Aug. 1, 1972

[54] 1,4-BIS-(CYCLOALKYLTHIO)PIPERAZINES

[72] Inventors: Aubert Y. Coran; Joseph E. Kerwood; Chester D. Trivette, Jr., all of Akron, Ohio

[73] Assignee: Monsanto Company, St. Louis, Mo.

[22] Filed: March 9, 1970

[21] Appl. No.: 17,971

Related U.S. Application Data

[63] Continuation-in-part of Ser. No. 518,987, Jan. 6, 1966, Pat. No. 3,513,139.

[52] U.S. Cl......260/268 S, 260/79.5 C, 260/239 BC, 260/247.1, 260/306.6 A, 260/326 SS, 260/306
[51] Int. Cl. ............................................C07d 51/70
[58] Field of Search.....................260/268 S, 239 BC

[56] References Cited

UNITED STATES PATENTS

| | | | |
|---|---|---|---|
| 2,514,181 | 7/1950 | Smith | 260/268 X |
| 2,955,104 | 10/1960 | Smith | 260/268 X |
| 3,449,323 | 6/1969 | Dunbar | 260/268 X |
| 3,513,139 | 5/1970 | Coran | 260/268 X |
| 3,301,832 | 1/1967 | Damico | 260/268 R |

FOREIGN PATENTS OR APPLICATIONS

| | | | |
|---|---|---|---|
| 1,123,580 | 12/1968 | Great Britain | 260/268 S |

*Primary Examiner*—Donald G. Daus
*Attorney*—Richard O. Zerbe, J. E. Maurer and Neal E. Willis

[57] ABSTRACT

Bis(cycloalkylthio)piperazines are prepared which are excellent inhibitors of premature-vulcanization.

2 Claims, No Drawings

1,4-BIS-(CYCLOALKYLTHIO)PIPERAZINES

This application is a continuation-in-part of application Ser. No. 518,987 filed Jan. 6, 1966, now U.S. Pat. No. 3,513,139, May 19, 1970.

This invention relates to an improved vulcanizing process for rubber and to the stocks obtained by using this improved process. The invention relates to improved accelerator-inhibitor combinations for rubber. More particularly, the invention relates to a method for preventing the aging and premature vulcanization of rubber stocks and to the rubber compositions obtained by using this method. The invention also relates to 1,4-bis(cycloalkylthio)piperazines useful in the improved process.

An object of this invention is to provide a method to effectively prevent the premature vulcanization of rubber. A further object of this invention is to provide a method to increase the available processing time prior to the actual vulcanization of rubber. A further object of this invention is to provide an increased cure rate for rubber. A further object of this invention is to provide a method to prevent the premature vulcanization of gum rubber in storage containing a vulcanization and accelerating agent. A further object of this invention is to improve the storage stability of an uncured rubber mixture containing an accelerator. A further object of this invention is to provide a method to prevent the premature vulcanization of rubber during the actual vulcanization step. A further object of this invention is to prevent the premature vulcanization of rubber at any time. A further object of this invention is to provide a safer method for processing and vulcanizing rubber. Other objects of the invention will become apparent as the description proceeds. These objects are accomplished by using the accelerator-inhibitor combinations of this invention.

SUMMARY OF THE INVENTION

We have discovered a class of sulfenamides which are outstanding inhibitors of premature vulcanization. The characteristic nucleus is

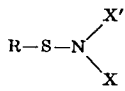

wherein x and x' taken together with the nitrogen atom is

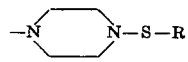

R is cycloalkyl. The term cycloalkyl includes cycloalkyl radicals of five to 12 carbon atoms, preferably five to eight.

Aryl sulfenamides derived from secondary amines have been described as vulcanization-accelerating agents. See U.S. Pat. Re 19,286, Zaucker assigned to I. G. Farbenindustrie (1934). It has also been reported that certain aryl sulfenamides characterized by the presence of an electronegative group in the aryl nucleus which ordinarily alone have no substantial accelerating power will, nevertheless, retard the action of nitrogen-containing vulcanization accelerators and will increase their strength. See U.S. Pat. Nos. 2,382,813 (1944) and 2,460,393 (1945) to Paul assigned to United States Rubber Co. Smith reported that 1,4-bis-phenylthio piperazine was a curing agent for fluoroelastomers. See U.S. Pat. No. 2,955,104, Smith assigned to E. I. duPont de Nemours (1960). More recently, Lober reported that pentachlorophenyl sulfenamides were vulcanization accelerators of the delayed-action type. See U.S. Pat. No. 3,047,546, Lober assigned to Farbenfabriken Bayer (1962).

The stocks of this invention may contain an amine to protect the rubber from degradation. The amine usually reduces processing safety, but the new vulcanizing systems are effective to prevent premature vulcanization in the presence thereof. The data infra illustrate that a combination of an accelerator and an inhibitor of this invention is an improved rubber additive which allows significantly longer and safer processing time for rubber than that provided hitherto for the rubber industry. Further, the accelerator-inhibitor combinations of this invention may improve the modulus of a vulcanizate considerably. The storage stability of a rubber mixture containing an accelerator-inhibitor combination of this invention is improved compared to a rubber mixture containing an accelerator alone. Inhibitors of this invention also enhance the antidegradant properties of a vulcanizate.

Examples of the premature-vulcanization inhibitors of this invention are 1,4-bis(cyclopentylthio)piperazine, 1,4-bis(cyclohexylthio)piperazine, 1,4-bis(methylcyclohexylthio)piperazine, 1,4-bis(cyclooctylthio)piperazine, 1,4-bis(cyclododecylthio)piperazine, 1,4-bis(ethylcyclohexylthio)piperazine and 1,4-bis(dimethyl cyclohexylthio)piperazine.

Rubber stocks containing delayed-action accelerators can be used in the process of this invention. Cheaper, more scorchy accelerators can also be used with an excellent degree of improvement. The improved vulcanizing method of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, organic accelerators, and antidegradants. For the purposes of this invention, sulfur-vulcanizing agent means elemental sulfur or sulfur-containing vulcanizing agent, for example, an amine disulfide, or a polymeric polysulfide. The invention is applicable to vulcanization accelerators of various classes. For example, rubber mixes containing the aromatic thiazole accelerators which include N-cyclohexyl benzothiazole-2-sulfenamide, 2-mercaptobenzothiazole, N-tert-butyl benzothiazole-2-sulfenamide, 2-benzothiazolyl diethyldithiocarbamate, and 2-(morpholinothio)benzothiazole can be used. Thiazole accelerators other than aromatic can be used. Stocks containing accelerators, for example tetramethylthiuram disulfide, tetramethylthiuram monosulfide, aldehyde amine condensation products, and guanidine derivatives, are substantially improved using the method of our invention. Stocks containing mixtures of accelerators are substantially improved by using the method of our invention. Rubber mixes containing antidegradants, for example N-1,3-dimethylbutyl-N'-phenyl-p-phenylenediamine, N,N'-bis(1,4-dimethylpentyl)-p-phenylenediamine, N,N'-bis(2-octyl)-p-phenylenediamine, and other phenylenediamines, ketone, ether, and hydroxy antidegradants and mixtures thereof, are substantially improved using the process of our invention.

The inhibitors of our invention can be used in natural and synthetic rubbers. Synthetic rubbers that can be improved by the process of this invention include cis-4-polybutadiene, butyl rubber, ethylene-propylene terpolymers, polymers of 1,3-butadiene, for example 1,3-butadiene itself and of isoprene and copolymers of 1,3-butadiene with other monomers, for example styrene, acrylonitrile, isobutylene, and methyl methacrylate. The invention relates to diene rubbers, and the terms rubber and diene rubber are synonymous for the purposes of this invention.

The following tables illustrate the invention in greater detail and the best mode for carrying it out, but are not to be construed as to narrow the scope of our invention. For the rubber stocks tested and described, infra, as illustrative of the invention, Mooney scorch times at 121° C. and 135° C. are determined by means of a Mooney plastometer. The time in minutes ($t_5$) required for the Mooney reading to rise 5 points above the minimum viscosity is recorded. Longer times are indicative of the activity of the inhibitor. Longer times on the Mooney scorch test are desirable because this indicates greater processing safety. Percentage increases in scorch delay are calculated by dividing the Mooney scorch time of the stock containing the premature-vulcanization inhibitor by the Mooney scorch time of the control stock, multiplying by 100, and subtracting 100. These increases show the percentage improvement in scorch delay over the control stock which contains no inhibitor. Curing characteristics are determined by means of the Monsanto Oscillating Disc Rheometer described by Decker, Wise, and Guerry in Rubber World, Dec., 1962, p. 68. From the Rheometer data, R. M. T. is the maximum modulus torque in Rheometer units, $t_3$ or $t_2$ is the time in minutes for a rise of 3 or 2 Rheometer units, respectively, above the minimum reading and $t_{90}$ is the time required to obtain a modulus 90 percent of the maximum. The difference between these two times, $t_{90}-t_2$, is indicative of cure rate. The specific rate constant "k" is measured in reciprocal minutes. See Coran, 37 Rubber Chemistry and Technology 689 (1964). Higher values of $k_2$ indicate higher rates of cross linking. With the aid of $k_2$, $k_1$ can be calculated and provides another measure of processing safety. Lower values of $k_1$ indicate less scorch or a longer delay time.

The trademarks of some compounds used in the practice of this invention are Santocure, Santocure MOR, Santoflex 77, Santocure NS and Thiofide. Santocure is the accelerator N-cyclohexyl benzothiazole-2-sulfenamide. Santocure MOR is the accelerator 2-(morpholinothio)-benzothiazole. Santoflex 77 is the antidegradant N,N'-bis(1,4-dimethylpentyl)-p-phenylenediamine. Santocure NS is the accelerator N-tert-butyl benzothiazole-2-sulfenamide. DPG is an accelerator reported to be diphenylguanidine. Thiofide is an accelerator reported to be benzothiazyl disulfide.

PREFERRED EMBODIMENTS

Table I illustrates the use of 1,4-bis(phenylthio)piperazine as a premature-vulcanization inhibitor in a natural rubber masterbatch containing the following:

| | Parts per hundred rubber |
|---|---|
| Natural rubber smoked sheets | 100 |
| Intermediate super-abrasion furnace carbon black | 60 |
| Zinc oxide | 5.0 |
| Stearic acid | 2.5 |
| Hydrocarbon softener | 20 |

TABLE I

| | Stocks | | | |
|---|---|---|---|---|
| | 1 | 2 | 3 | 4 |
| Materbatch | 187.5 | 187.5 | 187.5 | 187.5 |
| Sulfur | 2.5 | 2.5 | 2.5 | 2.5 |
| Santocure | 0.5 | 0.5 | 0.5 | 0.5 |
| N-1,3-dimethylbutyl-N'-phenyl-p-phenyl enediamine | – | – | 3.0 | 3.0 |
| 1,4-bis(phenylthio)-piperazine | – | 0.5 | – | 0.5 |
| Mooney Scorch at 121°C. | | | | |
| $t_5$ | 50.1 | 72.0 | 37.6 | 53.7 |
| % Increase in scorch delay | – | 44 | – | 43 |
| Rheometer at 144°C. | | | | |
| RMT | 46 | 61 | 50 | 61 |
| $t_3$ | 12.8 | 16.4 | 10.7 | 13.7 |
| $k_1$ | 0.012 | 0.0044 | 0.015 | 0.0062 |
| $k_2$ | 0.132 | 0.164 | 0.157 | 0.175 |

The natural rubber A-6 masterbatch is comprised of the following:

| | Parts per hundred rubber |
|---|---|
| Natural rubber smoked sheets | 100 |
| High abrasion furnace carbon black | 50 |
| Zinc oxide | 5 |
| Stearic acid | 3 |
| Hydrocarbon softener | 10 |

TABLE II

| | Stocks | |
|---|---|---|
| | 1 | 2 |
| A-6 Masterbatch | 168 | 168 |
| Sulfur | 2.5 | 2.5 |
| N-1,3-dimethylbutyl-N'-phenyl-p-phenylenediamine | 2.0 | 2.0 |
| Santocure MOR | 0.5 | 0.5 |
| 1,4-bis(n-butylthio)piperazine | – | 1.0 |
| Mooney scorch at 135°C. | | |
| $t_5$ | 12.9 | 23.8 |
| % Increase in scorch delay | – | 85 |
| Rheometer at 144°C. | | |
| RMT | 55.0 | 64.0 |
| $t_2$ | 9.8 | 17.7 |
| $t_{90}$ | 27.0 | 32.8 |
| $k_2$ | 0.138 | 0.145 |
| $t_{90}-t_2$ | 17.2 | 15.1 |

TABLE III

| | Stocks | |
|---|---|---|
| | 1 | 2 |
| A-6 Masterbatch | 168 | 168 |
| Sulfur | 2.5 | 2.5 |
| N-1,3-dimethylbutyl-N'-phenyl-p-phenylenediamine | 2.0 | 2.0 |
| Santocure MOR | 0.5 | 0.5 |
| 1,4-bis(benzylthio)piperazine | – | 1.0 |
| Mooney Scorch at 121°C. | | |
| $t_5$ | 44.5 | 69.5 |
| % Increase in scorch delay | – | 57 |
| % Increase in scorch delay | – | 57 |
| Rheometer at 144°C. | | |
| RMT | 54.0 | 64.1 |
| $t_2$ | 9.8 | 18.7 |
| $k_2$ | 0.145 | 0.134 |

Table IV illustrates the use of 1,4-bis(cyclohexylthio)piperazines as premature-vulcanization inhibitors in a natural rubber masterbatch containing the following:

| | Parts per hundred rubber |
|---|---|
| Natural rubber smoked sheets | 100 |
| Intermediate super-abrasion furnace carbon black | 45 |
| Zinc oxide | 3.0 |
| Stearic acid | 2.0 |
| Hydrocarbon softener | 5.0 |

The $t_5$ of each stock is determined by means of the Mooney plastometer in the manner described and the percent increase in scorch delay of stocks 2 and 3 calculated as compared to control stock 1 and the percent increase in scorch delay of stocks 5 and 6 calculated as compared to control stock 4.

TABLE IV

| | Stocks | | | | | |
|---|---|---|---|---|---|---|
| | 1 | 2 | 3 | 4 | 5 | 6 |
| Masterbatch | 155 | 155 | 155 | 155 | 155 | 155 |
| Sulfur | 2.2 | 2.2 | 2.2 | 2.2 | 2.2 | 2.2 |
| Santocure NS | 0.5 | 0.5 | 0.5 | 0.5 | 0.5 | 0.5 |
| N-1,3-dimethylbutyl-N'-phenyl-p-phenyl enediamine | – | – | – | 2.0 | 2.0 | 2.0 |
| 1,4-bis(cyclohexylthio)piperazine | – | 0.5 | 0.25 | – | 0.5 | – |
| 1,4-bis(cyclohexylthio)homopiperazine | – | – | – | – | – | 0.5 |
| Mooney Scorch at 121°C. % Increase in scorch delay | – | 196 | 91 | – | 175 | 99 |

The sulfenamides derived from piperazine are prepared by the method disclosed by Smith, supra, which comprises reacting the appropriate sulfenyl chloride with piperazine. 1,4-Bis(cyclohexylthio)-piperazine melts at 74°–75° C. A preferred method for preparing it comprises condensing N-cyclohexylthio phthalimide with piperazine as described in application of J. E. Kerwood of even date Ser. No. 17,944. Piperazine (8.6 g., 0.1 mole) dissolved in 75 ml. of isopropanol is added to a solution of N-cyclohexylthio phthalimide in 250 ml. of isopropanol at 55° C. The mixture is stirred for 6 hours at 55° C., then filtered to remove 29.5 grams of phthalimide. The filtrate is evaporated; the residue dissolved in heptane and filtered to remove residual impurities. The heptane is removed from the filtrate and 9.5 grams of N,N'-dicyclohexylthio piperazine is recovered. Recrystallized from methanol, the product melts at 74°–75° C. Analysis gives 61.08 percent carbon, 9.52 percent hydrogen, 20.32 percent sulfur and 8.93 percent nitrogen compared to 61.09 percent carbon, 9.61 percent hydrogen, 20.38 percent sulfur and 8.90 percent nitrogen calculated for $C_{16}H_{30}N_2S_2$.

The same procedure, with the exception homopiperazine is used, gives 1,4-bis(cyclohexylthio)homopiperazine which melts at 42° C. Analysis gives 62.33 percent carbon, 9.85 percent hydrogen, 8.52 percent nitrogen and 19.37 percent sulfur compared to 62.39 percent carbon, 9.82 percent hydrogen, 8.53 percent nitrogen and 19.51 percent sulfur calculated for $C_{17}H_{32}N_2S_2$.

Table V illustrates the use of 1,4-bis(cyclohexylthio)piperazine and 1,4-bis(phenylthio)piperazine as premature vulcanization inhibitors in styrene-butadiene rubber masterbatch containing the following:

| | Parts per hundred rubber |
|---|---|
| Oil-extended styrene-butadiene rubber | 137.5 |
| ISAF carbon black | 65.0 |
| Zinc oxide | 3.0 |
| Stearic acid | 1.0 |
| Hydrocarbon softener | 1.5 |

TABLE V

| | 1 | Stock 2 | 3 |
|---|---|---|---|
| Masterbatch | 208.0 | 208.0 | 208.0 |
| Sulfur | 2.0 | 2.0 | 2.0 |
| N-1,3-dimethylbutyl-N'-phenyl-p-phenylenediamine | 2.0 | 2.0 | 2.0 |
| Santocure NS | 1.0 | 1.0 | 1.0 |
| 1,4-bis(phenylthio)piperazine | – | 0.5 | – |
| 1,4-bis(cyclohexylthio)piperazine | – | – | 0.5 |
| Mooney Scorch at 135°C. $t_5$ | 23.7 | 36.1 | 43.2 |
| % Increase in scorch delay | – | 52 | 82 |
| Rheometer at 153°C. RMT | 65.2 | 62.5 | 62.9 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

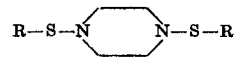

wherein R is cycloalkyl of five to eight carbon atoms.

2. The compound of claim 1 wherein R is cyclohexyl.

* * * * *